US007545610B2

(12) United States Patent
Nagata

(10) Patent No.: US 7,545,610 B2
(45) Date of Patent: Jun. 9, 2009

(54) CONSTANT-VOLTAGE POWER SUPPLY CIRCUIT WITH FOLD-BACK-TYPE OVERCURRENT PROTECTION CIRCUIT

(75) Inventor: Toshihisa Nagata, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 300 days.

(21) Appl. No.: 11/597,923

(22) PCT Filed: Apr. 17, 2006

(86) PCT No.: PCT/JP2006/308483

§ 371 (c)(1),
(2), (4) Date: Nov. 29, 2006

(87) PCT Pub. No.: WO2006/112527

PCT Pub. Date: Oct. 26, 2006

(65) Prior Publication Data

US 2008/0278127 A1 Nov. 13, 2008

(30) Foreign Application Priority Data

Apr. 19, 2005 (JP) ............................ 2005-121295

(51) Int. Cl.
*H02H 7/00* (2006.01)

(52) U.S. Cl. ....................................... 361/18; 361/93.3

(58) Field of Classification Search .................. 361/18, 361/93.3; 323/277, 281
See application file for complete search history.

(56) References Cited

U.S. PATENT DOCUMENTS

| | | | | |
|---|---|---|---|---|
| 6,509,723 | B2 | 1/2003 | Matsushita | |
| 6,816,392 | B2 | 11/2004 | Takamatsu | |
| 7,015,680 | B2 * | 3/2006 | Moraveji et al. | 323/274 |
| 7,233,462 | B2 * | 6/2007 | Kanakubo | 361/18 |
| 2002/0158679 | A1 | 10/2002 | Matsuo | |
| 2005/0036246 | A1 | 2/2005 | Nagata et al. | |

FOREIGN PATENT DOCUMENTS

| | | |
|---|---|---|
| JP | 3-158912 | 7/1991 |
| JP | 2000-66745 | 3/2000 |
| JP | 2001-75663 | 3/2001 |

* cited by examiner

*Primary Examiner*—Shawn Riley
(74) *Attorney, Agent, or Firm*—Dickstein Shapiro LLP

(57) ABSTRACT

A constant-voltage power supply circuit for converting an input voltage applied to an input terminal into a predetermined constant voltage for output from an output terminal includes an output transistor to supply from the input terminal to the output terminal an output current responsive to an applied control signal, an error amplifying circuit unit to receive a predetermined bias current to control an operation of the output transistor, and a bias current adjusting circuit unit to supply the error amplifying circuit unit with the bias current responsive to the output current output from the output transistor, wherein the bias current adjusting circuit unit is configured to suspend the supply of the bias current to the error amplifying circuit unit in response to lowering of the output voltage to a predetermined voltage.

20 Claims, 8 Drawing Sheets

CONSTANT-VOLTAGE POWER SUPPLY CIRCUIT WITH FOLD-BACK-TYPE OVERCURRENT PROTECTION CIRCUIT

TECHNICAL FIELD

The present invention generally relates to constant-voltage power supply circuits provided with an overcurrent protection circuit having a fold-back current limiting characteristic and methods of controlling such constant-voltage power supply circuits, and particularly relates to a constant-voltage power supply circuit and a method of controlling a constant-voltage power supply circuit in which provision is made to increase bias currents for various circuits constituting the constant-voltage power supply circuit in response to an increase in the output current, thereby enabling the overcurrent protection circuit to operate reliably.

BACKGROUND ART

In order to improve the response speed of a constant-voltage power supply circuit in response to the fluctuation of its output voltage, there is a known method of increasing a bias current supplied to a circuitry such as an error amplifying circuit constituting the constant-voltage power supply circuit. Another known method provides a second feedback loop capable of high-speed response in addition to the main feedback loop, and controls the output voltage by use of these two feedback loops.

In the method of increasing the bias current to the error amplifying circuit, only a limited increase in the bias current can be made since such an increase results in the current consumption of the constant-voltage power supply circuit being increased. In consideration of this, a certain circuit (see Japanese Patent Application Publication No. 3-158912) supplies the error amplifying circuit with a bias current proportional to the output current of the constant-voltage power supply circuit, thereby achieving both high-speed response and low current consumption.

FIG. 7 is a drawing showing an example of a constant-voltage power supply circuit which achieves such high-speed response and low power consumption, and is provided with an overcurrent protection circuit having a fold-back characteristic.

A constant-voltage power supply circuit 100 of FIG. 7 includes a reference voltage generating circuit 102 for generating and outputting a predetermined reference voltage Vref, an output-voltage-detection-purpose resistor R101 and output-voltage-detection-purpose resistor R102 for generating and outputting a divided voltage VFB by dividing the output voltage Vout that is the voltage appearing at the output terminal OUT, an output transistor M101 comprised of a PMOS transistor for controlling a current io produced at the output terminal OUT in response to the signal applied to the gate thereof, an error amplifying circuit 103 for controlling the operation of the output transistor M101 such as to make the divided voltage VFB equal to the reference voltage Vref, a bias current adjusting circuit 104 for adjusting the bias current of the error amplifying circuit 103 in response to the output current io, and an overcurrent protection circuit 105 having a fold-back output-voltage-versus-output-current characteristic that reduces the output current while lowering the output voltage Vout once the output current io exceeds a predetermined value.

The error amplifying circuit 103 amplifies a difference between the reference voltage Vref and the divided voltage VFB for provision to the gate of the output transistor M101, thereby controlling the operation of the output transistor M101 to set the output voltage Vout equal to a constant voltage.

In the bias current adjusting circuit 104, the drain current of a PMOS transistor M105 that serves to detect the output current io and outputs a current proportional to the output current io of the output transistor M101 increases as the output current io increases. The drain current of the PMOS transistor M105 is the drain current of an NMOS transistor M106, so that the drain currents of NMOS transistors M107 and M108 forming a current mirror circuit with the NMOS transistor M106 also increase.

The drain current of the NMOS transistor M107 is the bias current applied to an operational amplifier A101 of the error amplifying circuit 103, so that the bias current applied to the operational amplifier A101 increases in proportion to an increase in the output current io. The drain current of the NMOS transistor M108 is the bias current applied to a PMOS transistor M102, so that the bias current applied to the PMOS transistor M102 increases in proportion to an increase in the output current io. As a result, the response speed of the error amplifying circuit 103 responsive to the voltage fluctuation of the output voltage Vout increases as the output current io increases.

In the overcurrent protection circuit 105, when the output current io becomes a predetermined protection current amount, a voltage drop across a resistor R104 connecting between the drain of the PMOS transistor M103 and the ground potential exceeds the divided voltage VFB. As a result, the output voltage of an operational amplifier circuit A102 drops to turn on a PMOS transistor M104 to make it conductive, thereby suppressing the drop of the gate voltage of the output transistor M101. As shown in FIG. 8, consequently, the output voltage Vout is lowered, and the output current is reduced, resulting in the output current decreasing to become equal to the short-circuit current shown as "A" when the output voltage Vout is short-circuited, thereby protecting the constant-voltage power supply circuit 100 and a load 110 from an overcurrent. Such overcurrent protection circuit 105 is a so-called overcurrent protection circuit having a fold-back characteristic.

Since the output current io is an extremely large current when the overcurrent protection circuit 105 is operating, the bias current of the operational amplifier circuit A101 of the error amplifying circuit 103 is also large in such a case. The drive power of the output node of the operational amplifier A101 is thus extremely large, so that the drive power of the PMOS transistor M104 used in the overcurrent protection circuit 105 is not sufficient to bring the short-circuit current corresponding to the short-circuiting of the output voltage Vout to the point A shown in FIG. 8, resulting in the actual characteristics being those as shown by the solid line, which can bring the short-circuit current only to a point B. As a result, the power loss at the output transistor M101 becomes significant to generate excess heat, which may cause a failure to the IC when the constant-voltage power supply circuit is implemented as an IC chip.

In order to make the overcurrent protection circuit 105 operate fully to bring down the short-circuit current to the point A shown in FIG. 8, the drive power of the PMOS transistor M104 needs to be set far larger than the drive power of the error amplifying circuit 103.

An increase in the drive power of the PMOS transistor M104 requires an increase in the device size of the PMOS transistor M104, which results in the cost being increased due to an increase in the chip size when the constant-voltage power supply circuit 100 is implemented as an IC chip. Further, there is a need to increase the operating current of the overcurrent protection circuit 105, resulting in an increase in power consumption.

Accordingly, there is a need for a constant-voltage power supply circuit having an overcurrent protection circuit with a fold-back characteristic and a method of controlling such a constant-voltage power supply circuit in which the short-circuit current can be lowered to a predetermined current amount without increasing the device size of the PMOS transistor M104 and without increasing the operating current of the overcurrent protection circuit 105.

DISCLOSURE OF INVENTION

It is a general object of the present invention to provide a constant-voltage power supply circuit and a method of controlling the circuit that substantially obviate one or more problems caused by the limitations and disadvantages of the related art.

It is another and more specific object of the present invention to provide a constant-voltage power supply circuit having an overcurrent protection circuit and a method of controlling such a constant-voltage power supply circuit in which the short-circuit current can be lowered to a predetermined current amount without increasing the circuit size of the overcurrent protection circuit and without increasing the operating current of the overcurrent protection circuit.

In order to achieve the above objects according to the present invention, a constant-voltage power supply circuit for converting an input voltage applied to an input terminal into a predetermined constant voltage for output from an output terminal includes an output transistor to supply from the input terminal to the output terminal an output current responsive to an applied control signal, a reference voltage generating circuit unit to produce a predetermined reference voltage, an output voltage detecting circuit unit to detect an output voltage at the output terminal to produce a proportional voltage proportional to the detected output voltage, an error amplifying circuit unit to receive a predetermined bias current to control an operation of the output transistor such that the proportional voltage becomes equal to the reference voltage, a bias current adjusting circuit unit to supply the error amplifying circuit unit with the bias current responsive to the output current output from the output transistor, and an overcurrent protection circuit unit to control the output transistor to reduce the output voltage and the output current such that the output current becomes a predetermined short-circuited current amount upon lowering of the output voltage to a ground potential in response to exceeding of the output current over a predetermined overcurrent protection current amount when the output voltage is at rated voltage, wherein the error amplifying circuit unit is configured such that a response speed thereof responsive to voltage fluctuation of the output voltage changes in response to the received bias current, and the bias current adjusting circuit unit is configured to suspend the supply of the bias current to the error amplifying circuit unit in response to lowering of the output voltage to a predetermined voltage.

A method of controlling a constant-voltage power supply circuit for converting an input voltage applied to an input terminal into a predetermined constant voltage for output from an output terminal, wherein the constant-voltage power supply circuit includes an output transistor to supply from the input terminal to the output terminal an output current responsive to an applied control signal, and an output voltage control unit to generate a predetermined reference voltage and a proportional voltage proportional to an output voltage appearing at the output terminal to use at least one error amplifying circuit to amplify a difference between the reference voltage and the proportional voltage to apply the amplified difference to a control node of the output transistor, includes supplying the error amplifying circuit with a bias current responsive to the output current output from the output transistor, and suspending the supply of the bias current to the error amplifying circuit in response to lowering of the output voltage to the predetermined voltage.

According to at least one embodiment of the present invention, as the overcurrent protection circuit unit having a fold-back characteristic starts an operation, the bias current adjusting circuit unit suspends the supply of the bias current to the circuit for driving the output transistor, such as the error amplifying circuit unit, which is provided in the constant-voltage power supply circuit. This serves to leave behind only a fixed bias current. Accordingly, even when the a transistor having a drive power compatible to or smaller than that of a conventional overcurrent protection circuit is used, and the operation of the output transistor is controlled upon the operation of the overcurrent protection circuit, the short-circuit current set by the overcurrent protection circuit can be fully reduced to a desired current amount.

BEST MODE FOR CARRYING OUT THE INVENTION

In the following, embodiments of the present invention will be described with reference to the accompanying drawings.

FIRST EMBODIMENT

Figure 1:
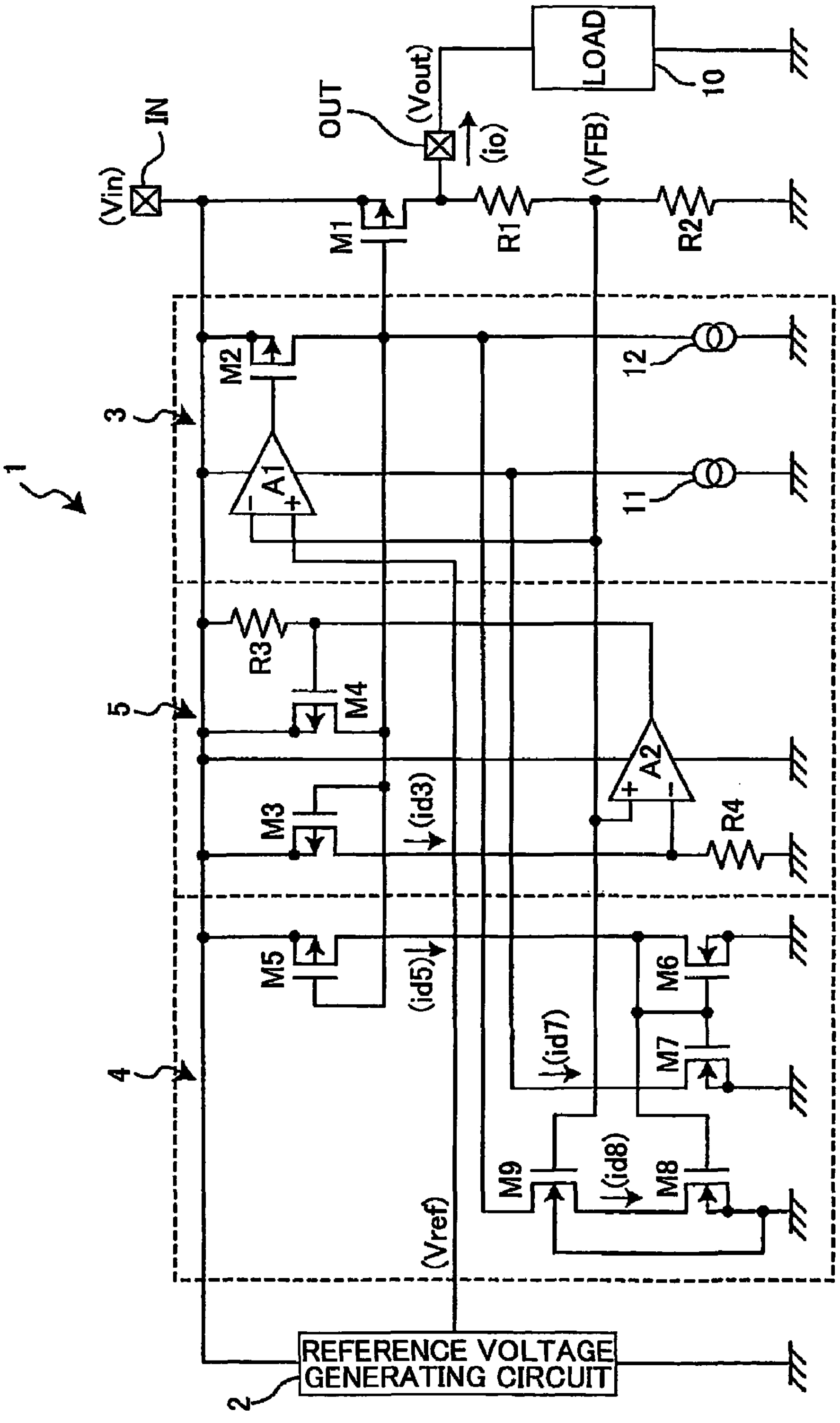
FIG. 1 is a drawing showing an example of a constant-voltage power supply circuit according to a first embodiment of the present invention.

FIG. 1 is a drawing showing an example of a constant-voltage power supply circuit according to a first embodiment of the present invention.

In FIG. 1, a constant-voltage power supply circuit 1 generates a predetermined constant voltage from an input voltage Vin input into an input terminal IN to output an output voltage Vout from an output terminal OUT. The output voltage Vout output from the output terminal OUT is supplied to a load 10 coupled to the output terminal OUT. The constant-voltage power supply circuit 1 may be implemented as a single IC chip.

A constant-voltage power supply circuit 1 of FIG. 1 includes a reference voltage generating circuit 2 for generating and outputting a predetermined reference voltage Vref, output-voltage-detection-purpose resistors R1 and R2 for generating and outputting a divided voltage VFB by dividing the output voltage Vout, an output transistor M1 comprised of a PMOS transistor for controlling a current io produced at the output terminal OUT in response to the signal applied to the gate thereof, a first error amplifying circuit 3 for controlling the operation of the output transistor M1 such as to make the divided voltage VFB equal to the reference voltage Vref, a bias current adjusting circuit 4 for adjusting the bias current of the first error amplifying circuit 3 in response to the output current io, and an overcurrent protection circuit 5 having a fold-back output-voltage-versus-output-current characteristic that reduces the output current io while lowering the output voltage Vout once the output current io becomes larger than a predetermined overcurrent protection current amount. The reference voltage generating circuit 2 corresponds to a reference voltage generating circuit unit, the resistors R1 and R2 to an output voltage detecting circuit unit, the first error amplifying circuit 3 to a first error amplifying circuit unit, the bias current adjusting circuit 4 to a bias current adjusting circuit unit, and the overcurrent protection circuit 5 to an overcurrent protection circuit unit. The reference voltage generating circuit 2, the resistors R1 and R2, and the first error amplifying circuit 3 constitute an output voltage controlling unit.

The first error amplifying circuit 3 includes an operational amplifier A1, a PMOS transistor M2, and constant current sources 11 and 12. The bias current adjusting circuit 4 includes a PMOS transistor M5 and NMOS transistors M6 through M9. The overcurrent protection circuit 5 includes an operational amplifier A2, PMOS transistors M3 and M4, and resistors R3 and R4. The PMOS transistor M2 corresponds to a first transistor, the NMOS transistor M9 to a control circuit, and the constant current sources 11 and 12 to a constant current circuit.

The output transistor M1 connects between the input terminal IN and the output terminal OUT, and the resistors R1 and R2 are connected in series between the output terminal OUT and the ground potential.

In the first error amplifying circuit 3, the PMOS transistor M2 and the constant current source 12 are connected in series between the input terminal IN and the ground potential, and the PMOS transistor M2 receives a predetermined bias current from the constant current source 12.

The joint point between the PMOS transistor M2 and the constant current source 12 is coupled to the gate of the output transistor M1. The operational amplifier A1 has the output terminal thereof connected to the gate of the PMOS transistor M2, the inverted input node thereof receiving the divided voltage VFB, and the non-inverted input node thereof receiving the reference voltage Vref. The operational amplifier A1 receives a predetermined bias current from the constant current source 11.

In the bias current adjusting circuit 4, the PMOS transistor M5 has the source node thereof coupled to the input terminal IN and the gate node thereof coupled to the gate node of the output transistor M1. The NMOS transistors M6 through M8 constitute a current mirror circuit, with the NMOS transistor M6 being connected between the drain of the PMOS transistor M5 and the ground potential. The gates of the NMOS transistors M6 through M8 are connected together, and the joint point is coupled to the drain of the NMOS transistor M6. The NMOS transistor M7 is connected in parallel to the constant current source 11. A series connection of the NMOS transistors M8 and M9 is connected in parallel to the constant current source 12. The gate of the NMOS transistor M9 receives the divided voltage VFB.

In the overcurrent protection circuit 5, the PMOS transistor M3 has the source node thereof coupled to the input terminal IN and the gate node thereof coupled to the gate node of the output transistor M1. The resistor R4 is connected between the drain of the PMOS transistor M3 and the ground potential. The joint point between the PMOS transistor M3 and the resistor R4 is coupled to the inverted input node of the operational amplifier A2. The operational amplifier A1 has the non-inverted input node thereof receiving the divided voltage VFB and the output node thereof coupled to the gate of the PMOS transistor M4. The PMOS transistor M4 connects between the input terminal IN and the gate of the output transistor M1. The resistor R3 connects between the input terminal IN and the gate of the PMOS transistor M4.

With this configuration, the first error amplifying circuit 3 controls the operation of the output transistor M1 such that the divided voltage VFB input into the operational amplifier A1 becomes equal to the reference voltage Vref. The drain current of the PMOS transistor M5 that outputs a current proportional to the output current of the output transistor M1 increases as the output current io increases. A drain current id5 is the drain current of the NMOS transistor M6, so that drain currents id7 and id8 of the NMOS transistors M7 and M8 forming the current mirror circuit with the NMOS transistor M6 also increase.

If the output current io is smaller than the predetermined overcurrent protection current amount, the source voltage of the NMOS transistor M9 is the drain voltage of the NMOS transistor M8 which is substantially equal to the gate voltage of the NMOS transistor M8, and the NMOS transistor M8 is in the turned-on state. Since the drain current id8 of the NMOS transistor M8 is the bias current applied to the PMOS transistor M2, the bias currents of the operational amplifier A1 and the PMOS transistor M2 increase in proportion to an increase in the output current io. As a result, the response speed of the first error amplifying circuit 3 responsive to the fluctuation of the output voltage Vout increases as the output current io increases.

Figure 2:
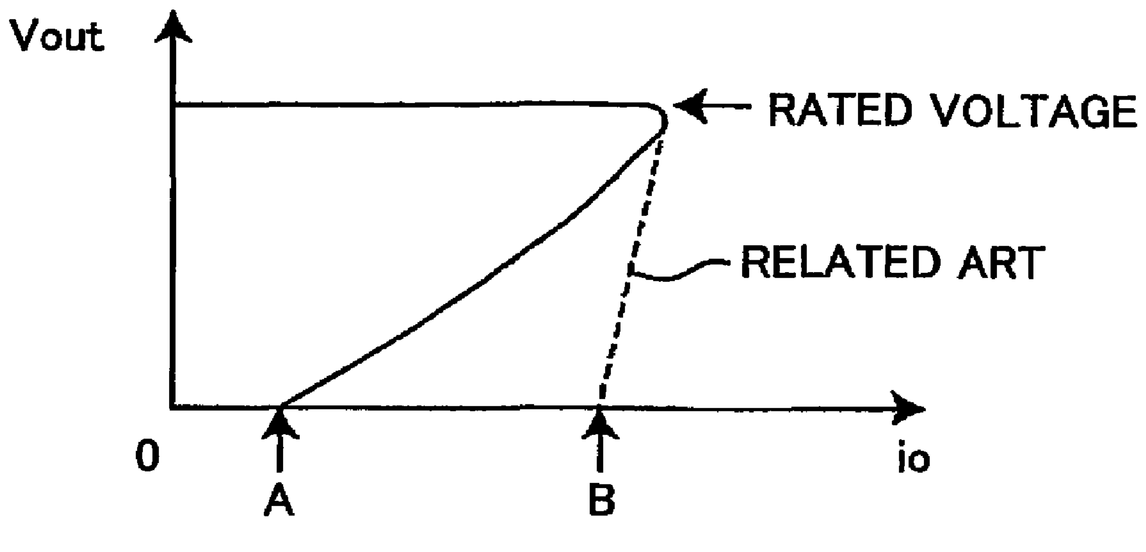
FIG. 2 is a drawing showing an example of the characteristics of the output voltage and output current of the constant-voltage power supply circuit shown in FIG. 1.

The PMOS transistor M3 outputs a current proportional to the output current of the output transistor M1. If the output current io becomes larger than the predetermined overcurrent protection current amount, the voltage drop across the resistor R4 exceeds the divided voltage VFB. As a result, the output voltage of the operational amplifier circuit A2 drops to turn on the PMOS transistor M4 to make it conductive, thereby suppressing the drop of the gate voltage of the output transistor M1. As shown in FIG. 2, consequently, the output voltage Vout is lowered, and the output current io is reduced, resulting in the output current decreasing to become equal to the short-circuit current shown as "A" in FIG. 2 when the output terminal OUT is short-circuited, thereby protecting the constant-voltage power supply circuit 1 and the load 10 from an overcurrent.

Together with the drop of the output voltage Vout, further, the gate voltage of the NMOS transistor M9 also drops. When the output voltage Vout is lowered to a predetermined voltage, the NMOS transistor M9 is turned off, thereby cutting off a portion of the bias current of the PMOS transistor M2 that is proportional to the output current io, leaving only the bias current from the constant current source 12. This reduces the drive power of the first error amplifying circuit 3 with respect to the output transistor M1, so that the output current io can be reduced fully to the predetermined short-circuit current amount shown as the point A in FIG. 2 even if the drive power of the PMOS transistor M4 is relatively small.

Figure 3:
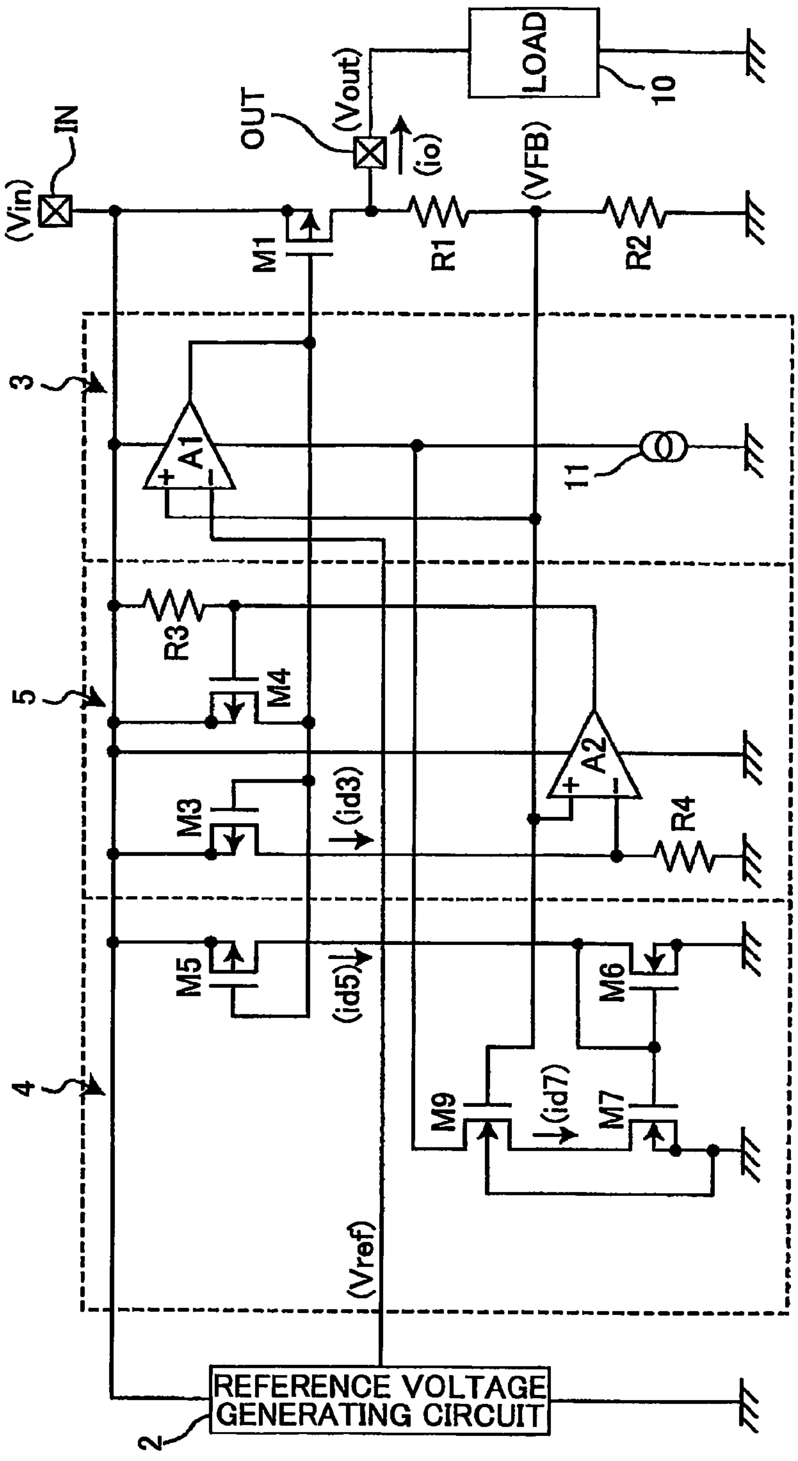
FIG. 3 is a drawing showing another example of the constant-voltage power supply circuit according to the first embodiment of the present invention.

Alternatively, provision may be made in FIG. 1 such that the PMOS transistor M2 of the first error amplifying circuit 3 is removed. In this case, the constant-voltage power supply circuit 1 has a configuration as shown in FIG. 3. In FIG. 3, the same elements as those of FIG. 1 are referred to by the same numerals, and a description thereof will be omitted. Differences from the configuration of FIG. 1 will only be described.

FIG. 3 differs from FIG. 1 in that the PMOS transistor M2, the constant current source 12, and the NMOS transistor M8 are removed, and that the NMOS transistor M9 is connected in series to the NMOS transistor M7.

In FIG. 3, the first error amplifying circuit 3 includes the operational amplifier A1 and the constant current source 11, with the output node of the operational amplifier A1 being coupled to the gate node of the output transistor M1. The operational amplifier A1 has the inverted input node thereof receiving the reference voltage Vref and the non-inverted input node thereof receiving the divided voltage VFB.

The bias current adjusting circuit 4 includes the PMOS transistors M5 and the NMOS transistors M6, M7, and M9. The NMOS transistors M6 and M7 together constitute a current mirror circuit. A series connection of the NMOS transistors M9 and M7 is connected in parallel to the constant current source 11.

With such configuration, if the output current io is smaller than the predetermined overcurrent protection current amount, the source voltage of the NMOS transistor M9 is the drain voltage of the NMOS transistor M7 which is substantially equal to the gate voltage of the NMOS transistor M7, and the NMOS transistor M9 is in the turned-on state. The drain current of the NMOS transistor M7 is the bias current applied to the operational amplifier A1, so that the bias current applied to the operational amplifier A1 increases in proportion to an increase in the output current io. As a result, the response speed of the first error amplifying circuit 3 responsive to the fluctuation of the output voltage Vout increases as the output current io increases.

When the output current io exceeds the predetermined overcurrent protection current amount so as to trigger the operation of the overcurrent protection circuit 5 to cause the drop of the output voltage Vout, the gate voltage of the NMOS transistor M9 also drops. When the output voltage Vout is lowered to a predetermined voltage, the NMOS transistor M9 is turned off, thereby cutting off a portion of the bias current of the operational amplifier A1 that is proportional to the output current io, leaving only the bias current from the constant current source 11. This reduces the drive power of the first error amplifying circuit 3 with respect to the output transistor M1, so that the output current io can be reduced fully to the predetermined short-circuit current amount shown as the point A in FIG. 2 even if the drive power of the PMOS transistor M4 is relatively small.

As was described above, the constant-voltage power supply circuit according to the first embodiment suspends the supply of the bias current from the bias current adjusting circuit 4 to the first error amplifying circuit 3 if the output current io exceeds the predetermined overcurrent protection current amount to trigger the operation of the overcurrent protection circuit 5 to drop the output voltage Vout, thereby reducing the drive power of the first error amplifying circuit 3 with respect to the output transistor M1. In this manner, the short-circuit current can be lowered to the predetermined current amount when the overcurrent protection circuit having a fold-back characteristic operates, without a need to increase the driver power of the overcurrent protection circuit with respect to the output transistor M1. Further, the transistor used in the overcurrent protection circuit to control the operation of the output transistor can be a transistor having a small current drive power, which contributes to suppressing increases in the cost and current consumption caused by an increase of the chip size.

SECOND EMBODIMENT

In the first embodiment described above, a single error amplifying circuit is provided to control the operation of the output transistor. Alternatively, the present invention may be applicable to a constant-voltage power supply circuit having such configuration that the operation of the output transistor is controlled simultaneously by a first error amplifying circuit having a superior direct-current characteristic with as large a direct-current gain as possible and by a second error amplifying circuit responding at high speed to the fluctuation of the output voltage Vout. The second embodiment of the present invention is directed to such a configuration.

Figure 4:
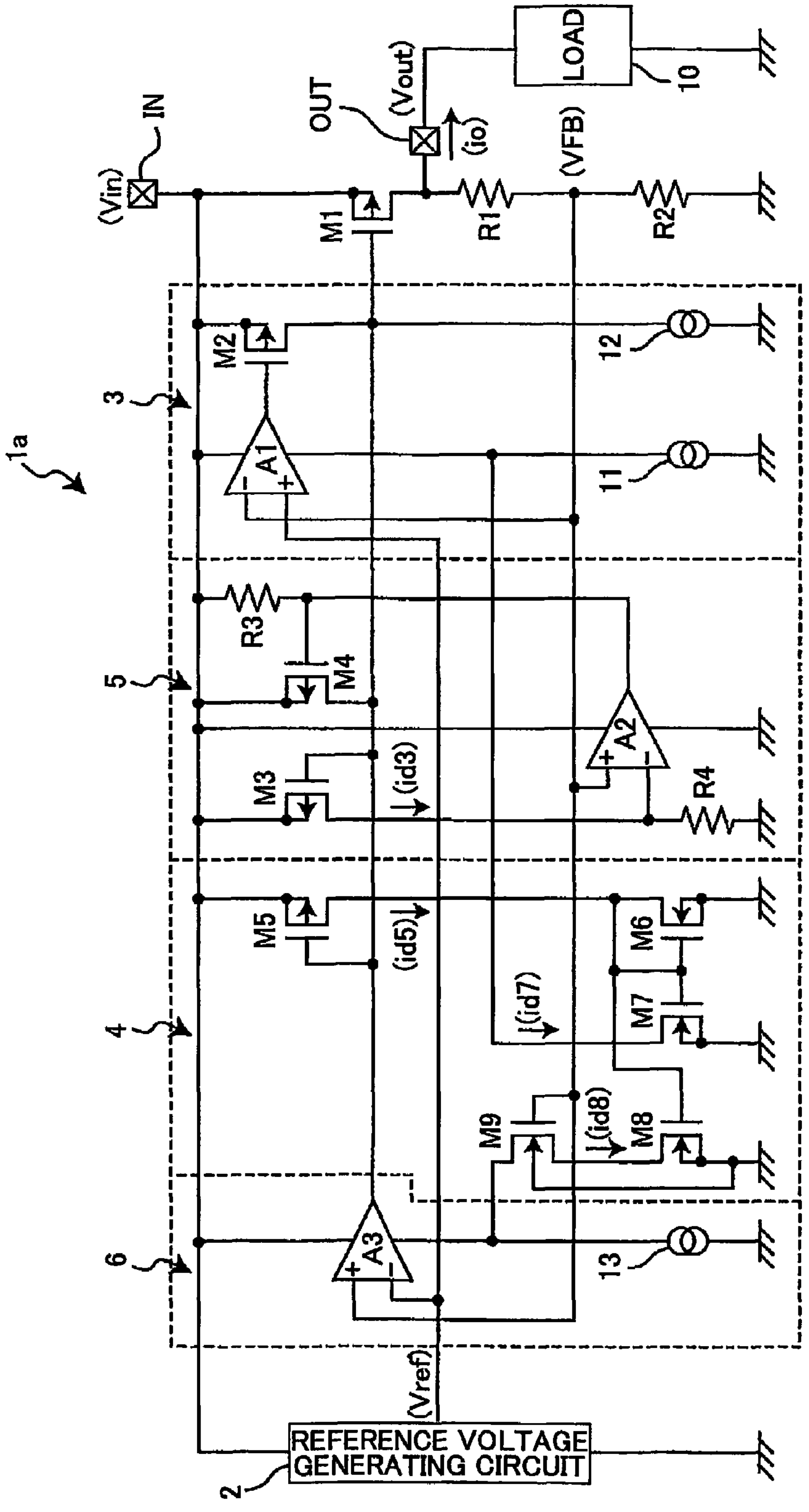
FIG. 4 is a drawing showing an example of a constant-voltage power supply circuit according to a second embodiment of the present invention.

FIG. 4 is a drawing showing an example of a constant-voltage power supply circuit according to a second embodiment of the present invention. In FIG. 4, the same elements as those of FIG. 1 are referred to by the same numerals, and a description thereof will be omitted. Differences from the configuration of FIG. 1 will only be described.

FIG. 4 differs from FIG. 1 in that a second error amplifying circuit 6 responding at high speed to the fluctuation of the output voltage Vout is additionally provided. With this change, the constant-voltage power supply circuit 1 of FIG. 1 is now designated as a constant-voltage power supply circuit 1*a*. The constant-voltage power supply circuit 1*a* may be implemented as a single IC chip.

The constant-voltage power supply circuit 1*a* of FIG. 4 includes the reference voltage generating circuit 2, the output-voltage-detection-purpose resistors R1 and R2, the output transistor M1, the first error amplifying circuit 3 for controlling the operation of the output transistor M1 such as to make the divided voltage VFB equal to the reference voltage Vref, the second error amplifying circuit 6 responding at high speed to the fluctuation of the output voltage Vout for the purpose of controlling the operation of the output transistor M1 such as to make the divided voltage VFB equal to the reference voltage Vref, the bias current adjusting circuit 4 for adjusting the bias currents of the first error amplifying circuit 3 and the second error amplifying circuit 6 in response to the output current io, and the overcurrent protection circuit 5. The first error amplifying circuit 3 and the second error amplifying circuit 6 together constitute an error amplifying circuit unit.

The second error amplifying circuit 6 includes an operational amplifier A3 and a constant current source 13, with the output node of the operational amplifier A3 being coupled to the gate node of the output transistor M1. The operational amplifier A3 has the inverted input node thereof receiving the reference voltage Vref and the non-inverted input node thereof receiving the divided voltage VFB. The operational amplifier A3 receives a predetermined bias current from the constant current source 13. In the bias current adjusting circuit 4, a series connection of the NMOS transistors M9 and M8 is connected in parallel to the constant current source 13.

In this configuration, the first error amplifying circuit 3 is designed such that the bias currents supplied from the constant current sources 11 and 12 are set as small as possible so as to set the direct-current gain as large as possible, thereby providing a superior direct-current characteristic. The second error amplifying circuit 6 is designed such that the bias current supplied from the constant current source 13 is set as large as possible so as to achieve a high-speed operation.

If the output current io is smaller than the predetermined overcurrent protection current amount, the source voltage of the NMOS transistor M9 is the drain voltage of the NMOS transistor M8 which is substantially equal to the gate voltage of the NMOS transistor M8, and the NMOS transistor M8 is in the turned-on state. The drain current id8 of the NMOS transistor M8 is the bias current applied to the operational amplifier A3, so that the bias current applied to the operational amplifier A3, like the bias current of the operational amplifier A1, increases in proportion to an increase in the output current io. As a result, the response speeds of the first error amplifying circuit 3 and the second error amplifying circuit 6 responsive to the fluctuation of the output voltage Vout both increase as the output current io increases.

When the output current io exceeds the predetermined overcurrent protection current amount so as to trigger the operation of the overcurrent protection circuit 5 to cause the drop of the output voltage Vout, the gate voltage of the NMOS transistor M9 also drops. When the output voltage Vout is lowered to a predetermined voltage, the NMOS transistor M9 is turned off, thereby cutting off a portion of the bias current of the operational amplifier A3 that is proportional to the output current io, leaving only the bias current from the constant current source 13. This reduces the drive power of the second error amplifying circuit 6 with respect to the output transistor M1, so that the output current io can be reduced fully to the predetermined short-circuit current amount shown as the point A in FIG. 2 even if the drive power of the PMOS transistor M4 is relatively small.

In FIG. 4, the PMOS transistor M2 of the first error amplifying circuit 3 may be removed. That is, the PMOS transistor M2 and the constant current source 12 are removed, and the output node of the operational amplifier A1 is connected to the gate of the output transistor M1, with the reference voltage Vref and the divided voltage VFB being input into the inverted input node and non-inverted input node of the operational amplifier A1, respectively.

As was described above, the constant-voltage power supply circuit according to the second embodiment suspends the supply of the bias current from the bias current adjusting circuit 4 to the second error amplifying circuit 6 if the output current io exceeds the predetermined overcurrent protection current amount to trigger the operation of the overcurrent protection circuit 5 to drop the output voltage Vout, thereby reducing the drive power of the second error amplifying circuit 6 with respect to the output transistor M1. In this manner, the short-circuit current can be lowered to the predetermined current amount when the overcurrent protection circuit having a fold-back characteristic operates, without a need to increase the driver power of the overcurrent protection circuit with respect to the output transistor.

THIRD EMBODIMENT

In the first and second embodiments described above, a phase compensation circuit may be provided to perform a phase compensation that lowers the gain of the bias current adjusting circuit with respect to the frequency band of signals generated on the negative feedback loop. The third embodiment of the present invention is directed to such a configuration.

Figure 5:
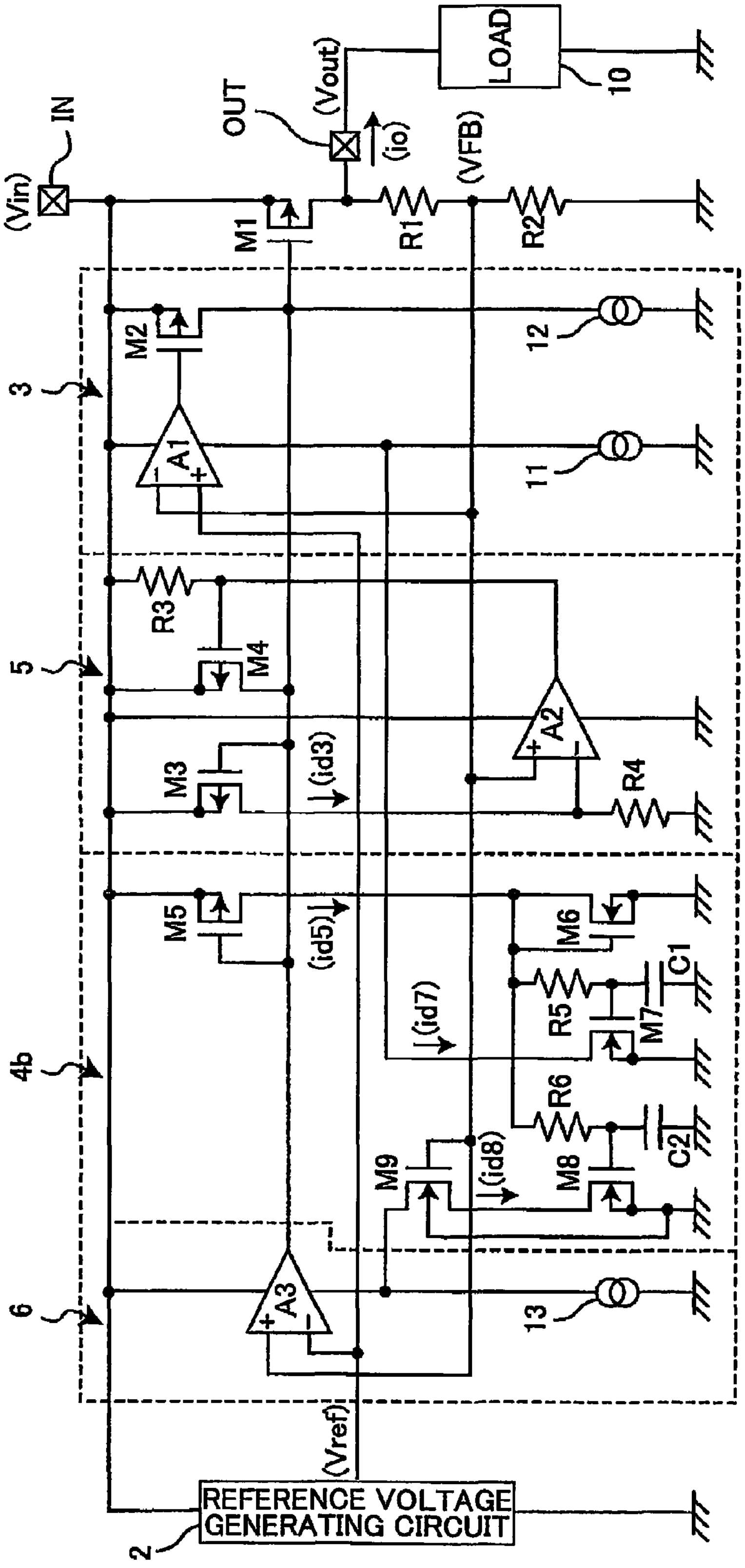
FIG. 5 is a drawing showing an example of a constant-voltage power supply circuit according to a third embodiment of the present invention.

FIG. 5 is a drawing showing an example of a constant-voltage power supply circuit according to a third embodiment of the present invention. FIG. 5 shows as an example a constant-voltage power supply circuit having the same configuration as that shown in FIG. 4. The same elements as those of FIG. 4 are referred to by the same numerals, and a description thereof will be omitted. Differences from the configuration of FIG. 4 will only be described.

FIG. 5 differs from FIG. 4 in that a phase compensation circuit is additionally provided in the bias current adjusting circuit 4 of FIG. 4 to perform a phase compensation that lowers the gain of the bias current adjusting circuit with respect to the frequency band of signals generated on the negative feedback loops formed for the operational amplifiers A1 and A3. With this change, the bias current adjusting circuit 4 of FIG. 4 is now designated as a bias current adjusting circuit 4*b*, and the constant-voltage power supply circuit 1 of FIG. 4 is now designated as a constant-voltage power supply circuit 1*b*. The constant-voltage power supply circuit 1*b* may be implemented as a single IC chip.

The constant-voltage power supply circuit 1*b* of FIG. 5 includes the reference voltage generating circuit 2, the output-voltage-detection-purpose resistors R1 and R2, the output transistor M1, the first error amplifying circuit 3, the second error amplifying circuit 6, the bias current adjusting circuit 4*b* for adjusting the bias currents of the first error amplifying circuit 3 and the second error amplifying circuit 6 in response to the output current io, and the overcurrent protection circuit 5. The bias current adjusting circuit 4*b* constitutes a bias current adjusting circuit unit.

The bias current adjusting circuit 4*b* includes the PMOS transistor M5, the NMOS transistors M6 through M9, condensers C1 and C2, and the resistors R5 and R6.

The NMOS transistors M6 though M8, the condensers C1 and C2, and the resistors R5 and R6 constitute a current mirror circuit. The NMOS transistor M7 is connected in parallel to the constant current source 11. The resistor R5 is connected between the gate of the NMOS transistor M6 and the gate of the NMOS transistor M7. The condenser C1 is connected between the gate of the NMOS transistor M7 and the ground potential. The NMOS transistor M9 is connected in series to the NMOS transistor M8, and this series circuit is connected in parallel to the constant current source 13. The resistor R6 is connected between the gate of the NMOS transistor M6 and the gate of the NMOS transistor M8. The condenser C2 is connected between the gate of the NMOS transistor M8 and the ground potential. The NMOS transistor M6 has the gate and drain thereof connected to each other.

In this configuration, a set of the condenser C1 and the resistor R5 and a set of the condenser C2 and the resistor R6 each constitute a low-pass filter, thereby serving as a phase compensation circuit. The frequency band determined by the impedance of the resistor R5 and the capacitance of the condenser C1 and the frequency band determined by the impedance of the resistor R6 and the capacitance of the condenser C2 are each set to frequencies where the gain of the bias current adjusting circuit 4*b* has its peak. This lowers the gain with respect to the frequency bands of signals generated on the negative feedback loops, thereby reducing the peak gain of the bias current adjusting circuit 4*b*. It is thus possible to prevent the operation of the bias current adjusting circuit 4*b* from becoming unstable.

Figure 6:
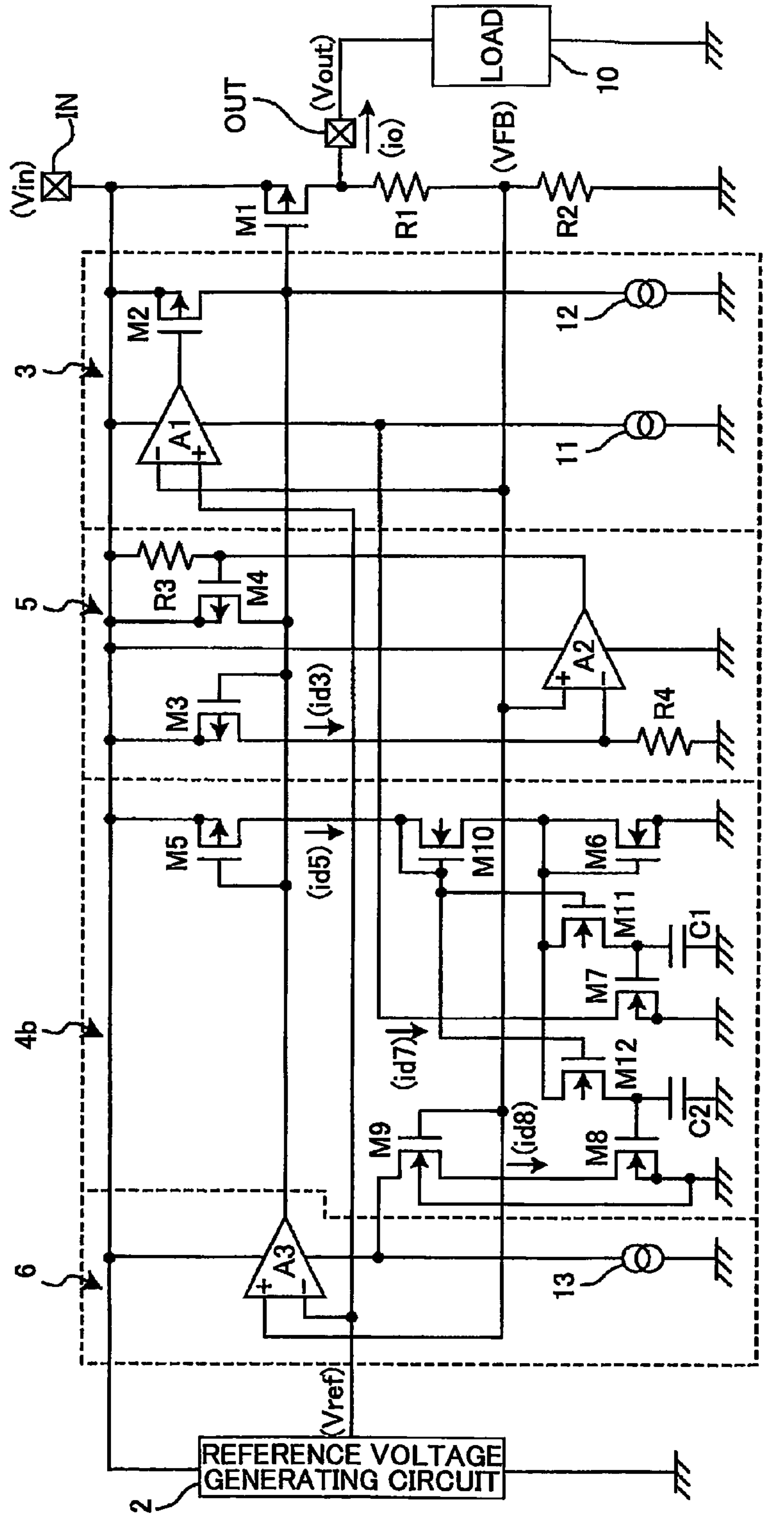
FIG. 6 is a drawing showing another example of the constant-voltage power supply circuit according to the third embodiment of the present invention.
Figure 7:
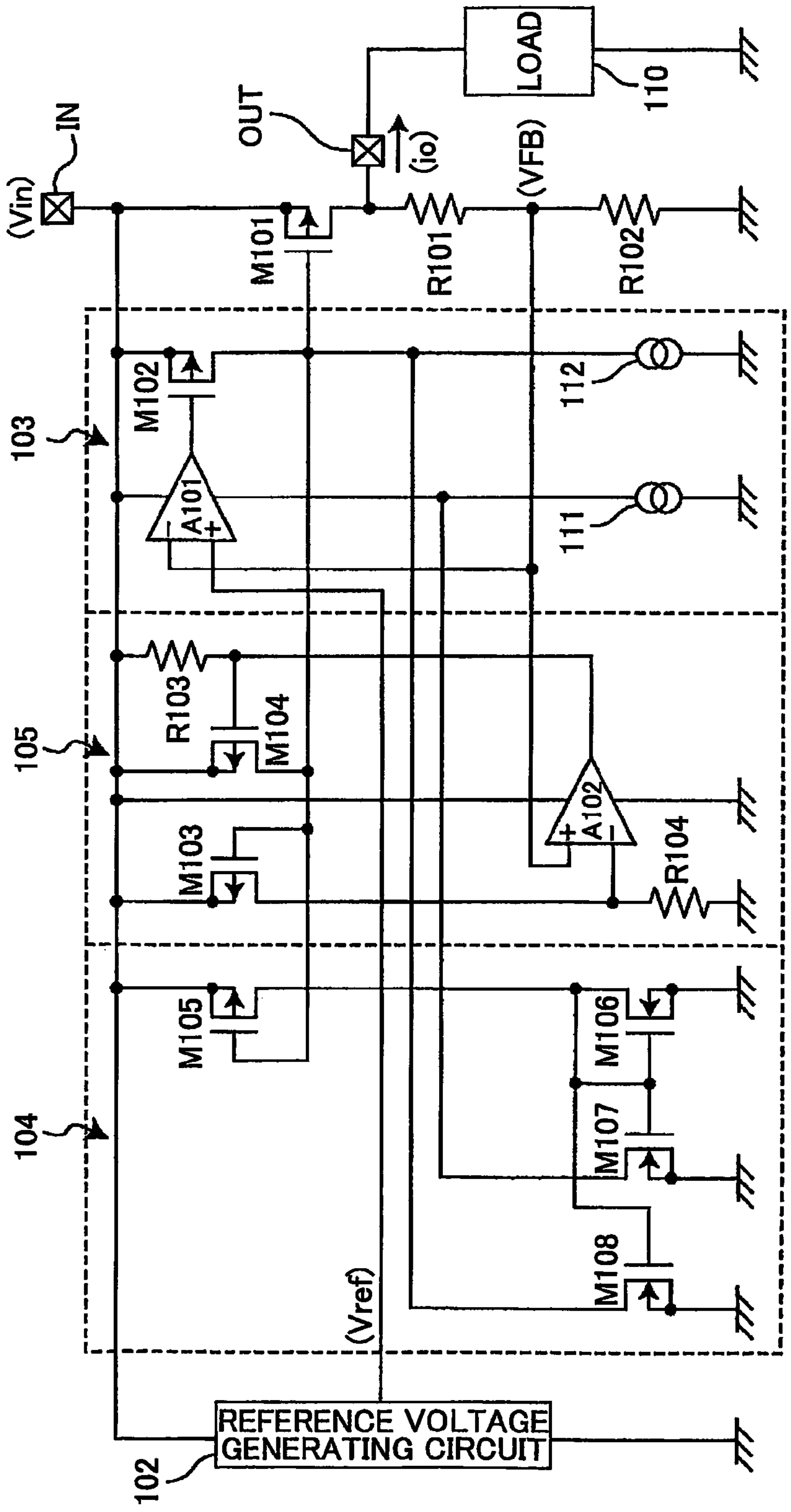
FIG. 7 is a drawing showing an example of a related-art constant-voltage power supply circuit.
Figure 8:
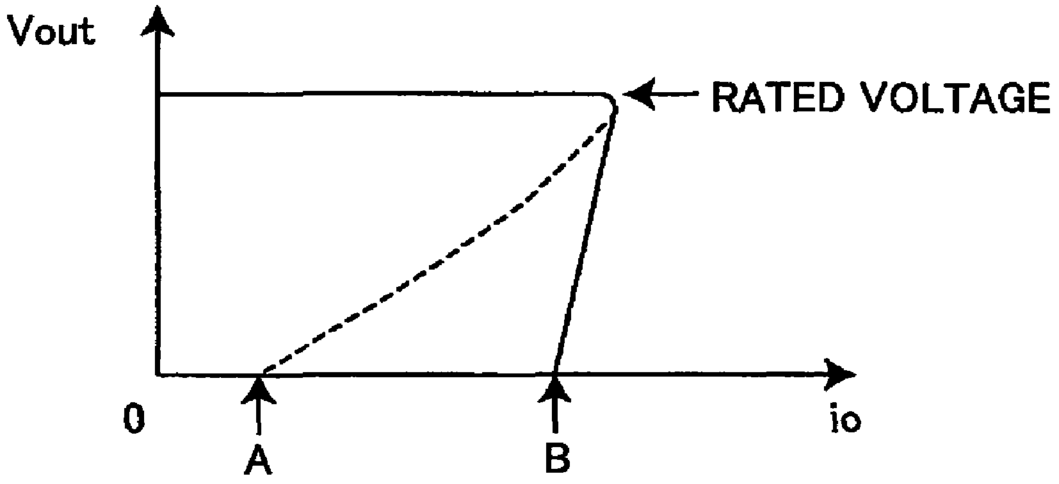
FIG. 8 is a drawing showing an example of the characteristics of the output voltage and output current of the constant-voltage power supply circuit shown in FIG. 7.

In FIG. 5, the frequency band in which the gain of the bias current adjusting circuit 4*b* has its peak is set by the impedance of a resistor and the capacitance of a capacitor. Alternatively, provision may be made such that the frequency band in which the gain of the bias current adjusting circuit 4*b* has its peak varies in response to the output current io. In such a case, the circuit of FIG. 6 may be used in place of the circuit of FIG. 5. In FIG. 6, the same elements as those of FIG. 5 are referred to by the same numerals, and a description thereof will be omitted. Differences from the configuration of FIG. 5 will only be described.

FIG. 6 differs from FIG. 5 in that NMOS transistors M10 through M12 are provided in place of the resistors R5 and R6.

In FIG. 6, the bias current adjusting circuit 4*b* serves to adjust the bias currents of the first error amplifying circuit 3 and the second error amplifying circuit 6 in response to the output current io, and includes the PMOS transistor M5, the NMOS transistors M6 through M12, and the condensers C1 and C2. The NMOS transistors M6 though M12 and the condensers C1 and C2 constitute a current mirror circuit. The NMOS transistors M10 through M12 further constitute a current mirror circuit.

In this configuration, the drain currents of the NMOS transistors M11 and M12 are proportional to the drain current of the NMOS transistor M10. The drain current of the NMOS transistor M10 is the same as that of the PMOS transistor M5, so that the drain currents of the NMOS transistors M11 and M12 are proportional to the output current io. In other words, the impedances of the NMOS transistors M11 and M12 are in inverse proportion to the output current io. When the impedances of the NMOS transistors M11 and M12 become small, the frequency band for which phase compensation is performed rises, thereby achieving an effective phase compensation for a broader range compared with the case of FIG. 5 while attaining the same advantages as in the case of FIG. 5. It is thus possible for the operation of the bias current adjusting circuit 4*b* to become more stable.

In this manner, the constant-voltage power supply circuit according to the third embodiment brings about the same advantages as in the second embodiment, and further stabilizes the operation of the bias current adjusting circuit 4*b*. Along with such stabilization, the operations of the first error amplifying circuit 3 and the second error amplifying circuit 6 are also stabilized, thereby providing an output voltage stable for all the frequency conditions.

In the first through third embodiments, the divided voltage VFB is applied to the gate of the NMOS transistor M9. Alternatively, a potential divider circuit for dividing the output voltage Vout may be provided separately to generate a divided voltage that is applied to the gate of the NMOS transistor M9. In the first through third embodiments, the NMOS transistor M9 is connected to the NMOS transistor M8 if the NMOS transistors M7 and M8 are provided. This is only a non-limiting example. The NMOS transistor M9 may alternatively be connected to the NMOS transistor M7. Alternatively, NMOS transistors each corresponding to the NMOS transistor M9 may be connected to the NMOS transistors M7 and M8, respectively.

Although the present invention has been described with reference to embodiments, the present invention is not limited to these embodiments, but various variations and modifications may be made without departing from the scope of the invention as set forth in the accompanying claims.

The present application is based on Japanese priority application No. 2005-121295 filed on Apr. 19, 2005, with the Japanese Patent Office, the entire contents of which are hereby incorporated by reference.

The invention claimed is:

1. A constant-voltage power supply circuit for converting an input voltage applied to an input terminal into a predetermined constant voltage for output from an output terminal, comprising:

an output transistor to supply from the input terminal to the output terminal an output current responsive to an applied control signal;

a reference voltage generating circuit unit to produce a predetermined reference voltage;

an output voltage detecting circuit unit to detect an output voltage at the output terminal to produce a proportional voltage proportional to the detected output voltage;

an error amplifying circuit unit to receive a predetermined bias current to control an operation of the output transistor such that the proportional voltage becomes equal to the reference voltage;

a bias current adjusting circuit unit to supply the error amplifying circuit unit with the bias current responsive to the output current output from the output transistor; and an overcurrent protection circuit unit to control the output transistor to reduce the output voltage and the output current such that the output current becomes a predetermined short-circuited current amount upon lowering of the output voltage to a ground potential in response to exceeding of the output current over a predetermined overcurrent protection current amount when the output voltage is at rated voltage, wherein the error amplifying circuit unit is configured such that a response speed thereof responsive to voltage fluctuation of the output voltage changes in response to the received bias current, and the bias current adjusting circuit unit is configured to suspend the supply of the bias current to the error amplifying circuit unit in response to lowering of the output voltage to a predetermined voltage.

2. The constant-voltage power supply circuit as claimed in claim 1, wherein the bias current adjusting circuit unit is configured to supply the error amplifying circuit unit with the bias current proportional to the output current output from the output transistor.

3. The constant-voltage power supply circuit as claimed in claim 1, wherein the error amplifying circuit unit includes:

an operational amplifier to amplify a difference between the proportional voltage and the reference voltage;

a first transistor to amplify an output signal of the operational amplifier to apply the control signal to a control node of the output transistor; and constant current source circuits to supply bias currents to the operational amplifier and the first transistor, respectively, wherein the bias current adjusting circuit unit is configured to supply a bias current to at least one of the operational amplifier and the first transistor and to suspend the supply of the bias current to said at least one of the operational amplifier and the first transistor in response to lowering of the output voltage to the predetermined voltage.

4. The constant-voltage power supply circuit as claimed in claim 1, wherein the error amplifying circuit unit includes:

an operational amplifier to amplify a difference between the proportional voltage and the reference voltage to apply the control signal to a control node of the output transistor; and a constant current source circuit to supply a predetermined bias current to the operational amplifier, wherein the bias current adjusting circuit unit is configured to supply a bias current to the operational amplifier and to suspend the supply of the bias current to the operational amplifier in response to lowering of the output voltage to the predetermined voltage.

5. The constant-voltage power supply circuit as claimed in claim 1, wherein the error amplifying circuit unit includes first and second error amplifying circuits that have different characteristics to control the output transistor such as to make the proportional voltage equal to the reference voltage, and the bias current adjusting circuit unit is configured to suspend the supply of the bias current to at least of the first and second error amplifying circuits in response to the lowering of the output voltage to the predetermined voltage.

6. The constant-voltage power supply circuit as claimed in claim 5, wherein the first error amplifying circuit has a direct-current gain larger than that of the second error amplifying circuit.

7. The constant-voltage power supply circuit as claimed in claim 5, wherein the second error amplifying circuit has a larger response speed responsive to voltage fluctuation of the output voltage than does the first error amplifying circuit.

8. The constant-voltage power supply circuit as claimed in claim 1, wherein the bias current adjusting circuit unit includes a phase compensation circuit to perform a phase compensation by lowering a gain of the bias current adjusting circuit unit with respect to a frequency band of a signal generated on a negative feedback loop that is formed by the output transistor, the output voltage detecting circuit unit, and the error amplifying circuit unit.

9. The constant-voltage power supply circuit as claimed in claim 8, wherein the phase compensation circuit is configured to change a frequency characteristic thereof in response to the output current output from the output transistor.

10. The constant-voltage power supply circuit as claimed in claim 3, wherein the bias current adjusting circuit unit includes:

a current detecting transistor having a control node thereof coupled to the control node of the output transistor and a current input node thereof coupled to the input terminal together with the output transistor to output a current proportional to the output current output from the output transistor;

a current mirror circuit to supply said at least one of the operational amplifier and the first transistor with a bias current proportional to the current output from the current detecting transistor; and a control circuit to cause the current mirror circuit to suspend the supply of the bias current to said at least one of the operational amplifier and the first transistor in response to the lowering of the output voltage at the output terminal to the predetermined voltage.

11. The constant-voltage power supply circuit as claimed in claim 10, wherein the current mirror circuit includes:

an input-side transistor to receive the current output from the current detecting transistor;

at least one output-side transistor to supply said at least one of the operational amplifier and the first transistor with a current proportional to the current input into the input-side transistor; and a phase compensation circuit including at least one low-pass filter connected between a control node of the input-side transistor and a control node of said at least one output-side transistor.

12. The constant-voltage power supply circuit as claimed in claim 4, wherein the bias current adjusting circuit unit includes:

a current detecting transistor having a control node thereof coupled to the control node of the output transistor and a current input node thereof coupled to the input terminal together with the output transistor to output a current proportional to the output current output from the output transistor;

a current mirror circuit to supply the operational amplifier with a bias current proportional to the current output from the current detecting transistor; and a control circuit to cause the current mirror circuit to suspend the supply of the bias current to the operational amplifier in response to the lowering of the output voltage at the output terminal to the predetermined voltage.

13. The constant-voltage power supply circuit as claimed in claim 12, wherein the current mirror circuit includes:

an input-side transistor to receive the current output from the current detecting transistor;

an output-side transistor to supply the operational amplifier with a current proportional to the current input into the input-side transistor; and a phase compensation circuit including a low-pass filter connected between a control node of the input-side transistor and a control node of the output-side transistor.

14. The constant-voltage power supply circuit as claimed in claim 5, wherein the bias current adjusting circuit unit includes:

a current detecting transistor having a control node thereof coupled to the control node of the output transistor and a current input node thereof coupled to the input terminal together with the output transistor to output a current proportional to the output current output from the output transistor;

a current mirror circuit to supply the first error amplifying circuit and the second error amplifying circuit with respective bias currents proportional to the current output from the current detecting transistor; and a control circuit to cause the current mirror circuit to suspend the supply of the bias current to the second error amplifying circuit in response to the lowering of the output voltage at the output terminal to the predetermined voltage.

15. The constant-voltage power supply circuit as claimed in claim 14, wherein the current mirror circuit includes:

an input-side transistor to receive the current output from the current detecting transistor;

output-side transistors to supply the first error amplifying circuit and the second error amplifying circuit with respective currents proportional to the current input into the input-side transistor; and a phase compensation circuit including low-pass filters connected between a control node of the input-side transistor and a control node of the respective output-side transistors.

16. The constant-voltage power supply circuit as claimed in claim 11, wherein the low-pass filter of the phase compensation circuit has a resistor thereof changing an impedance thereof in response to the current output from the current detecting transistor.

17. The constant-voltage power supply circuit as claimed in claim 16, wherein the resistor is a MOS transistor, and the phase compensation circuit is configured to change a gate-source voltage of the MOS transistor in response to the current output from the current detecting transistor.

18. The constant-voltage power supply circuit as claimed in claim 1, wherein the output transistor, the reference voltage generating circuit unit, the output voltage detecting circuit unit, the error amplifying circuit unit, the bias current adjusting circuit unit, and the overcurrent protection circuit unit are implemented on a single IC.

19. A method of controlling a constant-voltage power supply circuit for converting an input voltage applied to an input terminal into a predetermined constant voltage for output from an output terminal, wherein the constant-voltage power supply circuit includes an output transistor to supply from the input terminal to the output terminal an output current responsive to an applied control signal, and an output voltage control unit to generate a predetermined reference voltage and a proportional voltage proportional to an output voltage appearing at the output terminal to use at least one error amplifying circuit to amplify a difference between the reference voltage and the proportional voltage to apply the amplified difference to a control node of the output transistor, said method comprising:

supplying the error amplifying circuit with a bias current responsive to the output current output from the output transistor; and suspending the supply of the bias current to the error amplifying circuit in response to lowering of the output voltage to the predetermined voltage.

20. The method as claimed in claim 19, wherein a bias current proportional to the output current output from the output transistor is supplied to the error amplifying circuit.

* * * * *